(No Model.)
W. R. BRIGGS.
KNOB ATTACHMENT.
No. 350,576. Patented Oct. 12, 1886.
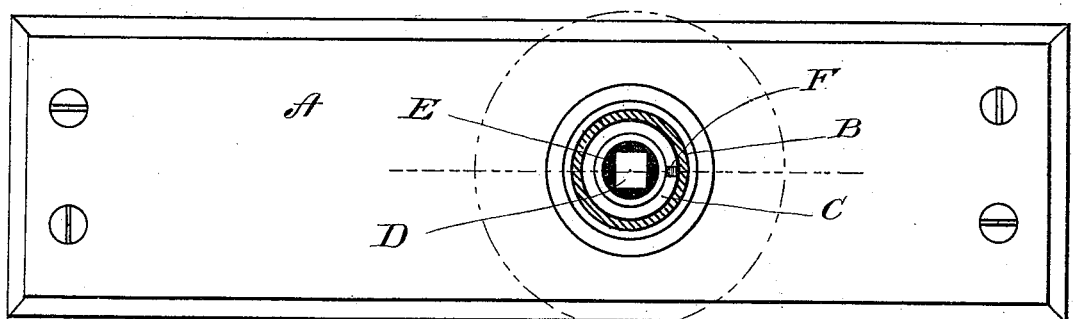
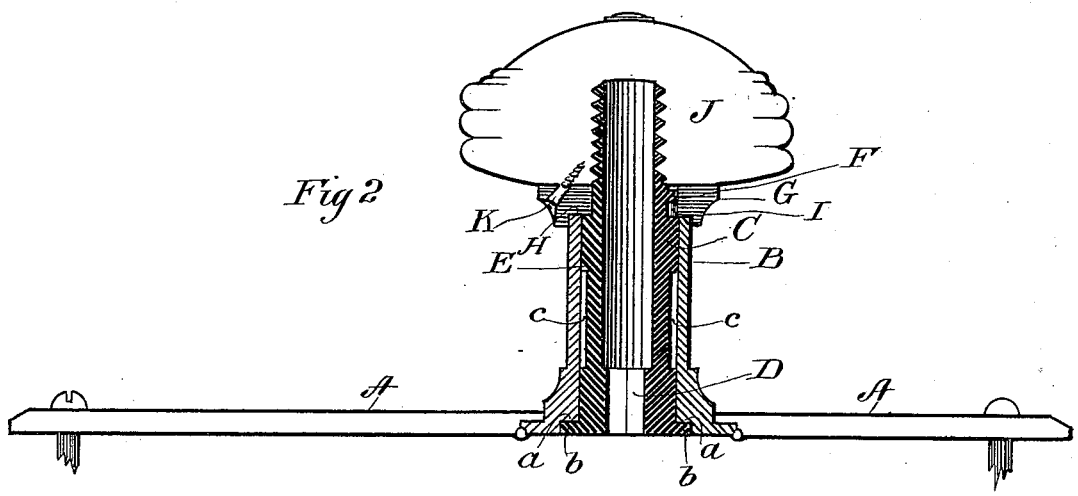
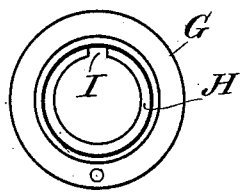
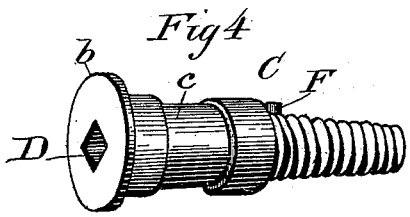
Witnesses
Julian H. Sterling
W. T. Harland
Inventor
Warren R. Briggs
By Smith & Hubbard
Attys

UNITED STATES PATENT OFFICE.

WARREN R. BRIGGS, OF BRIDGEPORT, CONNECTICUT.

KNOB ATTACHMENT.

SPECIFICATION forming part of Letters Patent No. 350,576, dated October 12, 1886.

Application filed April 5, 1886. Serial No. 197,813. (No model.)

*To all whom it may concern:*

Be it known that I, WARREN R. BRIGGS, a citizen of the United States, residing at Bridgeport, in the county of Fairfield and State of Connecticut, have invented certain new and useful Improvements in Knob Attachments; and I do hereby declare the following to be a full, clear, and exact description of the invention, such as will enable others skilled in the art to which it appertains to make and use the same.

My invention relates to certain novel and useful improvements in knob attachments, and has for its object to obviate the sagging and longitudinal play common to nearly if not quite all of the present knob attachments; and, furthermore, to insure a uniform distance between the knobs and the door, and to greatly facilitate the attaching and detaching of the knobs; and with these ends in view my invention consists in the details of construction hereinafter explained, and then recited in the claim.

In order that those skilled in the art to which my invention appertains may more fully understand its construction and operation, I will describe the same in detail, referring by letter to the accompanying drawings, forming a part of this specification, and in which—

Figure 1 is a front elevation showing the shank within the escutcheon-sleeve, the ring and knob being removed; Fig. 2, a central horizontal section showing all the parts in their proper relative position; Fig. 3, a detail of the ring, and Fig. 4 a detail perspective of the shank.

Similar letters denote like parts in all the figures of the drawings.

A is the escutcheon-plate, having formed therewith or rigidly secured thereto an outwardly-projecting sleeve, B. The rear end of this sleeve is shouldered, as seen at *a*, so as to afford an annular seat for the shank C, which latter has a flange, *b*, adapted to snugly fit said seat. This shank is adapted to fit closely within the sleeve, and to avoid unnecessary friction the central periphery of the shank is cut down, as seen at *c*. The opening through the shank is square in cross-section for a short distance, as seen at D, and round throughout the rest of its length, as seen at E, the object of this construction being to cheapen the manufacture merely, since the bearing for the ordinary spindle need only be a short one. The outer extremity of the shank is threaded to accommodate the knob, and is of less diameter than the portion within the sleeve.

F is a lug projecting from the shank at the base of the threaded portion.

G is a ring having an annular recess, H, and within the wall of said recess is a notch, I, for the purpose presently explained.

In assembled position, as shown at Fig. 2, the ring is placed around the outer end of the shank, so as to inclose within its annular recess the sleeve B. The lug F fits within the notch I, so that when the ring is turned the shank will turn also. The knob J is screwed on the shank, thereby drawing the several parts firmly together, and a single screw, K, secures the knob to the ring. It will thus be seen that the shank is secured to the escutcheon-plate without any screws or other means save the knob itself, and thus an exceedingly simple and effective attachment is afforded.

By making the ring and shank separate I am enabled to secure the latter within the escutcheon-plate, so as to turn freely without the use of any split collar or other independent means, and the several parts are readily assembled in operative position.

It is obvious that there can be no sagging of the knob, for the reason that the shank has a long bearing within the sleeve; also, there can be no longitudinal play of the shank, since the knob, when in position, keeps the sleeve snugly within the annular recess in the ring.

I have shown no spindle in connection with the shank, since my present improvement pertains solely to the manner of attaching the knobs to the door, and the spindle merely extends within the square opening in the shank.

Having described my invention, what I claim as new, and desire to secure by Letters Patent, is—

In a door-knob attachment, the escutcheon-plate having formed integral therewith or secured thereto an outwardly-projecting sleeve, the latter being shouldered at its rear end, in combination with the knob-shank having flange at its rear extremity adapted to fit snugly against said shoulder, and threaded at its outer portion, and provided with a lug at the base of said thread, independent ring having annular notched recess, and the knob adapted to be screwed on the shank against the ring, substantially as shown and specified.

In testimony whereof I affix my signature in presence of two witnesses.

WARREN R. BRIGGS.

Witnesses:
S. H. HUBBARD,
S. S. WILLIAMSON.